United States Patent

Auer et al.

[11] Patent Number: 6,066,410
[45] Date of Patent: May 23, 2000

[54] ANODE CATALYST FOR FUEL CELLS WITH POLYMER ELECTROLYTE MEMBRANES

[75] Inventors: Emmanuel Auer, Frankfurt; Walter Behl, Mömbris; Thomas Lehmann, Langenselbold; Udo Stenke, Mainaschaff, all of Germany

[73] Assignee: Degussa Aktiengesellschaft, Frankfurt, Germany

[21] Appl. No.: 09/213,357

[22] Filed: Dec. 17, 1998

[30] Foreign Application Priority Data

Dec. 19, 1997 [DE] Germany ............ 197 56 880

[51] Int. Cl.⁷ .................................................. H01M 4/86
[52] U.S. Cl. .................. 429/40; 429/44; 204/290 R; 204/293; 502/182; 502/185; 502/334
[58] Field of Search .................... 429/40, 44; 204/290 R, 204/293; 502/182, 185, 334

[56] References Cited

U.S. PATENT DOCUMENTS

| | | | |
|---|---|---|---|
| 4,171,287 | 10/1979 | Keith | 502/334 |
| 4,746,584 | 5/1988 | Ten Hover et al. | 204/290 R |
| 5,096,866 | 3/1992 | Itoh et al. | 502/185 |
| 5,489,563 | 2/1996 | Brand et al. | 502/185 |
| 5,856,036 | 1/1999 | Smotkin et al. | 429/44 |
| 5,900,386 | 5/1999 | Freund et al. | 502/185 |
| 5,922,488 | 7/1999 | Marucchi-Soos et al. | 429/44 |
| 6,007,934 | 12/1999 | Auer et al. | 429/44 |

FOREIGN PATENT DOCUMENTS

| | | |
|---|---|---|
| 0423627 | 4/1991 | European Pat. Off. . |
| 0501930 | 9/1992 | European Pat. Off. . |
| 0549543 | 6/1993 | European Pat. Off. . |
| 44 43 705 | 6/1996 | Germany . |

OTHER PUBLICATIONS

L. W. Niedrach, et al., "Electrocatalysts for Hydrogen/Carbon Monoxide Fuel Cell Anodes," *Electrochemical Technology*, vol. 5 (Jul./Aug. 1967), pp. 318–323.

M. Iwase, et al., "Optimized CO Tolerant Electrocatalysts for Polymer Electrolyte Fuel Cells," *Electrochemical Society Proceedings*, vol. 95–23, pp. 12–23. No Month/Year Available.

*Primary Examiner*—Bruce F. Bell
*Attorney, Agent, or Firm*—Smith, Gambrell & Russell, LLP

[57] ABSTRACT

A platinum/ruthenium alloy catalyst that includes finely dispersed alloy particles on a powdery, electrically conductive carrier material. The catalyst is particularly resistant to carbon monoxide poisoning when the alloy particles display mean crystallite sizes of 0.5 to less than 2 nm.

14 Claims, No Drawings

ANODE CATALYST FOR FUEL CELLS WITH POLYMER ELECTROLYTE MEMBRANES

INTRODUCTION AND BACKGROUND

The present invention relates to a platinum/ruthenium alloy catalyst containing finely dispersed alloy particles on a powdery, electrically conductive carrier material. The catalyst is particularly suitable as an anode catalyst for fuel cells having a polymer electrolyte membrane.

Fuel cells are, in principle, gas-operated batteries in which the energy derived from the reaction of hydrogen and oxygen is directly converted into electrical energy. The instant invention describes the preparation of catalysts for fuel cells, in particular the preparation of supported catalysts based on platinum and platinum alloys for PEM fuel cells (PEM=polymer electrolyte membrane). This type of fuel cell is gaining growing importance as a source of current for motor vehicles driven by electric motors because of its high energy density and robustness.

Compared to conventional combustion engines, fuel cells display very low emissions with, at the same time, very high efficiency. When hydrogen is used as the fuel gas, water is the only emission formed on the cathode side of the cell. Motor vehicles with this type of drive are termed ZEV (Zero Emission Vehicles).

Hydrogen is, however, too expensive at the present time and causes problems in storage and in the fuelling of vehicles. This explains the growing importance of the alternative of generating hydrogen directly on board the vehicle through the reforming of methanol. The methanol stored in the vehicle tank is converted in a steam reforming process at 200–300° C. into a hydrogen-rich fuel gas with carbon dioxide and carbon monoxide as secondary constituents. After converting the carbon monoxide by the shift reaction, preferential oxidation (PROX) or other purification process, this fuel gas is conducted directly to the anode side of the PEM fuel cell. The reformed gas theoretically consists of 75 vol. % hydrogen and 25 vol. % carbon dioxide. In practice, however, this gas still contains nitrogen, oxygen and, depending on degree of purity, fluctuating amounts of carbon monoxide (up to 1 vol. %).

Catalysts based on platinum and platinum alloys are used as catalysts on the anode side and on the cathode side of the PEM fuel cell. These consist of finely divided precious metal particles that are precipitated onto a conductive carrier material (generally carbon black or graphite). The precious metal content ranges from 10 to 50 wt. %, based on the total weight of the catalyst.

Since conventional platinum catalysts are very sensitive to carbon monoxide poisoning, the carbon monoxide content of the fuel gas must be lowered to below 10 ppm to prevent performance loss in the fuel cells due to poisoning of the anode catalyst. This applies in particular to the PEM fuel cell that is particularly sensitive to carbon monoxide poisoning with its low working temperatures of 70 to 100° C.

The instant invention relates to the preparation of supported catalysts on the basis of bimetallic platinum/ruthenium alloy catalysts that display a high resistance to carbon monoxide poisoning. Carbon monoxide contents of the reformed gas in excess of 100 ppm should be possible and lead to virtually no perceptible performance losses in the PEM fuel cell.

The use of novel catalysts of this kind on the anode side of the PEM fuel cell can reduce the number of process steps needed to remove carbon monoxide from the fuel gas. This leads to a substantial reduction in the system costs, to an improvement in the efficiency of the system and makes the entire system smaller. The new catalysts are therefore of great importance for the introduction of the PEM fuel cell in motor vehicles.

The problem of the poisoning of platinum catalysts by carbon monoxide has been known for a long time. In view of its special molecular structure, carbon monoxide is adsorbed onto the surface of the platinum, thereby blocking access for the hydrogen molecules of the fuel gas to the catalytically active centers of the platinum.

By adding water, the adsorbed carbon monoxide can be oxidized to carbon dioxide and can then be removed from the surface of the catalyst. It is also known that the tolerance of the platinum catalyst to carbon monoxide poisoning can be improved by alloying or doping the platinum with other metals.

EP 0 501 930 B1 describes for example quaternary alloys of platinum, nickel, cobalt and manganese as anode catalyst of phosphoric acid fuel cells (PAFC: phosphoric acid fuel cell) that possesses good resistance to carbon monoxide at the high operating temperatures of a phosphoric acid fuel cell of 160 to 200° C. The size of the alloy particles is in the region of 3 nm. At the high operating temperatures of the phosphoric acid fuel cell, however, there is at the outset a reduced tendency for the carbon monoxide to adsorb onto metal surfaces than at the low operating temperatures of a PEM fuel cell.

L. W. Niedrach et.al. (J. Electrochemical Techn. 5, 1967, S.318) describe the use of Pt/Ru catalysts as CO-tolerant anode catalysts for sulphuric acid fuel cells. These materials consist of fine Pt/Ru alloy powders with high specific surfaces. They are prepared using the so-called ADAMS process in a melt of platinum chloride, ruthenium and sodium nitrate at 500° C. Because of the high temperatures during preparation, these catalysts are present as Pt/Ru alloys. The materials are not fixed to a carrier and therefore do not constitute supported catalysts. Moreover there is no information on their use in a PEM fuel cell.

EP 0 549 543 B1 describes a process for the preparation of supported catalysts that contain highly dispersed metal particles with mean particle sizes of under 2 nm. The process consists in reducing metal ions in a suspension of the carrier material by means of a reducing agent in the presence of carbon monoxide and simultaneously precipitating them onto the carrier. The carbon monoxide present is adsorbed onto the precipitating metal particles and thereby hinder further particle growth. Following completed precipitation, the catalyst is washed and dried at a temperature below 100° C. in a reducing atmosphere. The carbon monoxide is thereby desorbed. Example 4 describes the preparation of a platinum/ruthenium catalyst on carbon with a mean particle size of the platinum/ruthenium particles of 1.7 nm. In this case, however, the catalyst is not an alloy catalyst, since the adsorption of the carbon monoxide on the metal particles during precipitation prevents the formation of an alloy. Nor is any alloy formed during the subsequent temperature treatment up to 100° C. No statement is made regarding the properties of this catalyst in use as anode catalyst in a PEM fuel cell with a reformed gas containing carbon monoxide.

A platinum/ruthenium alloy catalyst on a carrier material has been commercially available for some time. This is a Pt/Ru alloy catalyst with a precious metal loading between 5 and 40 wt. % and a Pt/Ru atomic ratio of 1:1. This catalyst displays a uniform alloy phase that can be determined using XRD. Examinations of this catalyst indicated an unsatisfactory tolerance to carbon monoxide, in particular at carbon monoxide concentrations over 100 ppm and residual oxygen in the fuel gas.

In a recent paper, M. Iwase and S. Kawatsu report on the development of CO-tolerant anode catalysts (M. Iwase and S. Kawatsu, Electrochemical Society Proceedings, Volume 95–23, S. 12). In this paper, the best results were achieved with a Pt/Ru alloy catalyst in which the formation of the alloy was obtained by a special temperature treatment. The voltage drop at a current density of 0.4 A/cm$^2$ was nonetheless still ca. 200 mV at a CO-content of 100 ppm. This is still too high for practical use. Still poorer results were, however, achieved with an unalloyed Pt/Ru catalyst.

The positive effect of the ruthenium on the resistance to poisoning is attributed to the fact that, in the presence of oxygen when ruthenium is present, carbon monoxide is oxidized to carbon dioxide which displays a lesser tendency to adsorption on metal surfaces than does carbon monoxide.

It is therefore an object of the instant invention to prepare a platinum/ruthenium alloy catalyst on a carrier that displays improved tolerance to carbon monoxide.

A further object of the instant invention is to provide a catalyst suitable for operation with carbon monoxide-, nitrogen- and oxygen-containing fuel gases which also displays a voltage drop that is as low as possible with high current densities at carbon monoxide contents of the fuel gas of more than 100 ppm.

SUMMARY OF THE INVENTION

The above and other objects of the invention can be achieved by a platinum/ruthenium alloy catalyst that contains finely dispersed alloy particles on a powdery, electrically conductive carrier material. The alloy catalyst is characterized in that the alloy particles display mean crystallite sizes from 0.5 to less than 2 nm.

It has now surprisingly been found that the Pt/Ru alloy catalysts display a very good Co tolerance up to a concentration of 150 ppm carbon monoxide in the fuel gas when the alloy particles are smaller than 2 nm. However, the electrochemical activity of the catalysts is diminished below a particle size of 0.5 nm, with the result that smaller particles are not interesting for use in catalysts.

Another feature of the instant invention is a process for making the catalyst as described herein.

Yet another feature of the instant invention is the fuel cell containing the catalyst of the invention.

Still another feature of the invention is the gas diffusion electrode for the anode side of a PEM fuel cell comprising the catalyst as described herein.

DETAILED DESCRIPTION OF INVENTION

The causes for the improved carbon monoxide tolerance of the alloy catalysts of the invention is not yet fully understood. A possible explanation could lie in the fact that the alloy particles display different surface areas. There are, for example, surface areas that are substantially formed by platinum atoms and that are therefore subject to carbon monoxide poisoning. In addition, there are other surface areas that are formed by ruthenium atoms. By means of diffusion processes onto the alloy particles the carbon monoxide adsorbed onto the platinum atoms comes into contact with the ruthenium atoms and can be oxidized there to carbon dioxide in the presence of oxygen. Because of the small size of the alloy particles of the catalyst of the invention, this diffusion process also already occurs sufficiently frequently at the low operating temperatures of a PEM fuel cell, with the result that an effective regeneration of the platinum surfaces is possible.

The speed-determining step of the oxidation of carbon monoxide is thus not the reaction with the oxygen on the ruthenium surface, but the diffusion of the carbon monoxide on the crystallite surface from platinum atoms to ruthenium atoms.

Carbon black, graphited carbon black, graphite or active charcoal with specific surfaces (BET surfaces, measured in accordance with DIN 66132) of about 40 to 1500 m$^2$/g can be used as electrically conductive carrier material for the catalyst. The platinum/ruthenium alloy particles are applied to these carriers in a concentration of 10 to 50 wt. % related to the total weight of the catalyst. The platinum/ruthenium atomic ratio lies between 1:4 and 4:1, with a ratio of 1:1 being, however, preferred.

To prepare the catalyst of the invention the alloy particles must be applied to the carrier in highly dispersed form with mean particle sizes under 2 nm. These low particle sizes are only obtained with difficulty using conventional impregnation procedures. In addition, it is necessary to ensure that a genuine alloy formation occurs. This is customarily achieved by temperature treatment at temperatures above 800 to 900° C. These high temperatures lead, however, to an enlargement of the precipitated metal particles and therefore make it impossible to obtain the catalyst of the invention.

In accordance with the invention, the precipitation of the precious metals onto the carrier material occurs through impregnation with the aid of pre-formed, surfactant-stabilized platinum/ruthenium alloy colloids. The preparation of bimetallic alloy colloids is described in EP 423 627 B1 and in DE 44 43 705 A1 both of which are relied on for this purpose and incorporated herein by reference.

In accordance with EP 423 627 B1, salts of the appropriate metals are reacted individually or as a mixture with tetraalkyl ammonium triorganohydroborates without use of hydrogen in tetrahydrofuran (THF) to prepare alloy colloids. The alloy colloids formed can be separated from the reaction solution by filtration and can be very easily redispersed in inert, organic solvents such as THF, diglyme or hydrocarbons.

DE 44 43 705 A1 describes the preparation of water-soluble, surfactant-stabilized alloy powders. For this purpose, metal salts are reacted in the presence of strongly hydrophilic surfactants from the series of amphiphilic betaines, cationic surfactants, fatty alcohol polyglycol ethers, polyoxyethylene carbohydrate fatty alkyl esters and/ or anionic surfactants and/or amphiphilic sugar surfactants in THF, alcohols or directly in water with chemical reducing agents such as hydrides, hydrogen or alkali formiate between 0 and 100° C. and then isolated. The alloy colloids so obtained are water-soluble. For purposes of the instant invention, amphiphilic betaines such as 3-(N,N-dimethyldodecylammonio) propane sulphonate, lauryldimethyl carboxymethyl ammonium betaine or cocoamidopropyl betaine are preferably used on account of their ready decomposability through temperature treatment.

After impregnation, the product obtained is washed with appropriate solvents. The stabilizing surfactant shell of the colloid particles is removed by calcination, which simultaneously activates the catalyst for its use as anode catalyst in the PEM fuel cell.

In contrast to the Pt/Ru alloy catalysts produced in conventional manner by calcination at high temperatures, the supported preformed colloids not only display an improved precious metal dispersion and smaller alloy particles, but they are also distinguished as having a very good CO tolerance as a result of the higher accessible precious metal surface.

In the case of conventional alloy catalysts of the two metals, the temperature needed for the alloy formation leads to a pronounced coarsening of the precious metal particles and to an exchange of the lattice sites of platinum and ruthenium. As a result, part of the ruthenium is no longer available at the particle surface. Both effects lead to a decrease in the performance data under reformate/air conditions with concentrations of carbon monoxide in the anode gas greater than 100 ppm.

Various measures in the preparation of the Pt/Ru colloid catalysts of the invention ensure that the bimetallic colloid particles are present on the carrier in high dispersion and that no coarsening of the preformed alloy particles occurs.

The temperature during the precipitation of the colloid particles is thus maintained between 20 and 110° C. depending on the solvent used and a highly dispersed distribution of the bimetallic colloid particles is achieved by optimizing the speed of addition, reducing the diffusion limitation by stirring and using electrolytes. After removing the solvent by filtration or distillation, the catalyst is appropriately dried under vacuum. Calcination of the catalyst at temperatures between 200 and 400° C. under inert gas removes still adhering protective colloid without residue and activates the catalyst.

The catalyst is used to prepare various components of fuel cells. Thus, for example, it is possible to prepare gas diffusion electrodes that contain a porous catalyst layer on a hydrophobized, electrically conductive substrate material. For this purpose, the catalyst is processed into an ink using a solution of NAFION® and applied in this form to a conductive hydrophobized carbon paper (manufacturer: TORAY, TGC 90). The coating of the carbon paper with precious metal is conventionally 0.01 to 0.5, 0.2 mg precious metal/cm$^2$ being preferred.

Using a gas diffusion electrode it is possible to prepare a so-called membrane electrode assembly that contains a proton-conducting polymer membrane and gas diffusion electrodes on the anode side and on the cathode side, the above-described gas diffusion electrode being used for the anode side.

As an alternative component for fuel cells it is possible to prepare a proton-conducting polymer membrane that displays one catalyst layer on each of the anode side and the cathode side, the catalyst layer of the anode side containing the catalyst of the invention in the concentrations already cited above.

The following examples serve for the better understanding of the invention. The catalysts prepared in the Examples were characterized using X-ray diffraction (XRD) and transmission electron microscopy (TEM). They were then processed into a gas diffusion electrode and a membrane electrode assembly (MEA), the catalysts being used on the anode side of the MEU.

The CO tolerance was determined in a PEM fuel cell with a cell format of 25 cm$^2$. The fuel gas used was a simulated methanol reformed gas of the composition 50 vol. % hydrogen, 10 vol.% nitrogen, 20 to 25 vol. % carbon dioxide with up to 150 ppm carbon monoxide and oxygen constituents up to 5 vol. %. The voltage drop ΔU (mV) occurring after addition of a specific amount of carbon monoxide constitutes a measure for the CO tolerance of the catalyst. The smaller this voltage drop, the better the CO tolerance of the catalyst. The catalysts of the invention generally display ΔU values that are markedly better than the comparable values of the commercially available catalyst.

EXAMPLE 1

The following procedure was adopted to prepare a platinum/ruthenium colloid catalyst according to the invention with a precious metal content of 20 wt. % and a platinum/ruthenium atomic ratio of 1:1.

To a solution of 56.5 g Pt/Ru colloid (Pt/Ru atomic ratio: 1:1, proportion of Pt in the colloid: 6.5 wt. %, prepared according to EP 423 627 B1, Example 10, from PtCl$_2$ and RuCl$_3$ with tetrabutyl ammonium triethyl hydroborate in THF) in 2100 ml toluene under a current of nitrogen there was added in each case 500 ml acetone and toluene and 22.25 g Vulcan XC-72 (Cabot) was suspended therein with stirring. This was initially stirred for 30 min at room temperature and then at 50° C. also for 30 min. The catalyst was filtered off, washed with 100 ml toluene/acetone (1:1) and dried at 80° C. in a vacuum. The catalyst was then calcinated at 350° C. for 1 hour under a current of nitrogen.

The XRD spectrum of the catalyst showed the shifted (110) reflex of the platinum at about 40° (2 theta), suggesting an alloy formation with ruthenium. In contrast, the (111) reflex of the ruthenium at 2 theta=44° could not be detected. The crystallite size of the platinum/ruthenium crystallites was approximately 1.1 nm, the lattice constant was 0.388 nm.

EXAMPLE 2

Another platinum/ruthenium colloid catalyst according to the invention was prepared as follows with a precious metal content of 20 wt. % and a platinum/ruthenium atomic ratio of 1:1:

16.5 g Vulcan XC-72 (Cabot) were suspended in 1000 ml toluene and reacted with a solution of 40.0 g of the Pt/Ru colloid of Example 1 in 1000 ml toluene at room temperature under a current of nitrogen. This was initially heated to reflux for 60 min and the solvent removed in a vacuum at 50° C. The catalyst was then washed with 100 ml acetone and dried in a vacuum at 80° C. The catalyst was subsequently calcined for 1 h at 350° C. under a current of nitrogen.

The X-ray analysis of this catalyst also showed the presence of a Pt/Ru alloy, the crystallite size was 1.8 nm, the lattice constant 0.388 nm.

COMPARATIVE EXAMPLE 1

For the following working examples, a commercially available Pt/Ru-supported catalyst (E-TEC) with a precious metal content of 20 wt. % and a Pt/Ru atomic ratio of 1:1 was also used. The X-ray analysis (XRD) of this catalyst also showed the presence of a Pt/Ru alloy as in Examples 1 and 2. The crystallite size (XRD) of the Pt/Ru crystallite was, however, 2.7 nm.

WORKING EXAMPLE

The catalysts of the preceding examples were in each case processed to an ink using a solution of NAFION® and applied in this form to a conducting hydrophobized carbon paper (manufacturer: TORAY, TGC 90). The coating was in all cases 0.2 mg precious metal/cm$^2$. The anode prepared in this manner was hot-pressed together with an ion-conductive membrane (NAPION® 117) and a cathode electrode (coating 0.3 mg Pt/cm$^2$) and a membrane electrode assembly (MEA) prepared in this manner.

The electrochemical performance data was measured in a single cell (pressureless operation, temperature 75° C.), a current density of 0.5 A/cm² being set.

A fuel gas of the following composition was selected:
58 vol. % hydrogen, 15 vol. % nitrogen,
24 vol. % carbon dioxide, 3 vol. % oxygen.

The carbon monoxide content of the fuel gas was adjusted to 100 ppm and to 120 ppm in a second measuring series. The measured voltage drops ΔU compared to the measurement without addition of carbon monoxide are listed in Table 1.

TABLE 1

| Example | 100 ppm CO ΔU [mV] | 120 ppm CO ΔU [mV] |
|---------|--------------------|--------------------|
| B1 | 18 | 27 |
| B2 | 16 | 37 |
| V1 | 80 | 128 |

The PEM fuel cell with the comparative catalyst VI shows the highest voltage drop. The lowest voltage drop with high carbon monoxide contents of the fuel gas is displayed by the PEM fuel cell with the catalyst according to Example 1 which contained the smallest alloy particles (only 1.1 nm compared to 2.7 nm in the case of the comparative catalyst).

Further variations and modifications of the foregoing will be apparent to those skilled in the art and are intended to be encompassed by the claims appended hereto.

German priority application 197 56 880.7 is relied on and incorporated herein by reference.

What is claimed is:

1. A platinum/ruthenium alloy catalyst comprising finely dispersed alloy particles on a powdery, electrically conductive carrier material, wherein the alloy particles have a mean crystallite size ranging from 0.5 to less than 2 nm.

2. The platinum/ruthenium alloy catalyst according to claim 1 wherein said means crystallite size ranges from 1.1 to 1.8 nm.

3. The alloy catalyst according to claim 1, wherein the electrically conductive carrier material is a member selected from the group consisting of carbon black, graphited carbon black, graphite and active charcoal.

4. The alloy catalyst according to claim 1, wherein the ratio of platinum and ruthenium ranges from 10 to 50 wt. % related to the total weight of the alloy catalyst.

5. The process according to claim 4, further comprising stabilizing said alloy colloid with a hydrophilic surfactant selected from the group consisting of amphiphilic betaines and using an aqueous solvent to apply the colloid to the carrier material.

6. A process for the preparation of an alloy catalyst according to claim 1, comprising suspending an electrically conductive carrier material in a solvent to form a suspension and depositing alloy particles on said carrier material by adding a preformed, surfactant-stabilized, bimetallic platinum/ruthenium alloy colloid at elevated temperatures between 20 and 110° C., removing said solvent to thereby separate said catalyst from liquid phase of the suspension, and activating said catalyst by calcinating at temperatures between 200 and 400° C. under inert gas.

7. The process according to claim 6, further comprising washing said catalyst prior to calcination.

8. An alloy catalyst prepared by the process according to claim 7.

9. The process according to claim 6, wherein said solvent is an organic solvent selected from the group consisting of tetrahydrofuran, diglyme and hydrocarbons.

10. An alloy catalyst prepared by the process according to claim 6.

11. A gas diffusion electrode for the anode side of a PEM fuel cell that comprises a porous catalyst layer on a hydrophobized, electrically conductive substrate material, wherein the catalyst layer contains the bimetallic alloy catalyst according to claim 1.

12. A membrane electrode assembly for PEM fuel cells that comprises a proton-conducting polymer membrane and gas diffusion electrodes on the anode side and on the cathode side, wherein said gas diffusion electrode is the gas diffusion electrode according to claim 11 on the anode side.

13. A proton-conducting polymer membrane for PEM fuel cells which displays one catalyst layer each on the anode side and on the cathode side, wherein the catalyst layer on the anode side contains the catalyst according to claim 1.

14. A PEM fuel cell comprising a catalyst according to claim 1.

* * * * *

UNITED STATES PATENT AND TRADEMARK OFFICE
CERTIFICATE OF CORRECTION

PATENT NO.      : 6,066,410
DATED           : May 23, 2000
INVENTOR(S)     : Emmanuel Auer et al.

It is certified that error appears in the above-identified patent and that said Letters Patent is hereby corrected as shown below:

Claim 2,
Line 2, "means" has been changed to -- mean --.

Claim 5,
Line 1, "4", has been changed to -- 6, --.

Signed and Sealed this

Ninth Day of April, 2002

Attest:

JAMES E. ROGAN
Attesting Officer    Director of the United States Patent and Trademark Office